United States Patent [19]

Potter et al.

[11] Patent Number: 4,993,944
[45] Date of Patent: Feb. 19, 1991

[54] DIRECT GAS-FIRED BURNER ASSEMBLY

[75] Inventors: Gary J. Potter; Robert W. Reinkemeyer, both of St. Charles County; Clifford L. Heitmann, St. Louis County, all of Mo.

[73] Assignee: Cambridge Engineering, Inc., Chesterfield, Mo.

[21] Appl. No.: 480,888

[22] Filed: Feb. 16, 1990

Related U.S. Application Data

[63] Continuation-in-part of Ser. No. 240,150, Sep. 2, 1988, Pat. No. 4,929,541.

[51] Int. Cl.$^5$ ............................................. F24H 1/00
[52] U.S. Cl. ................................. 432/222; 431/350; 431/351
[58] Field of Search ............... 431/350, 351; 432/222, 432/223

[56] References Cited

U.S. PATENT DOCUMENTS

| | | | |
|---|---|---|---|
| 4,523,905 | 6/1985 | Lewis | 431/351 |
| 4,610,626 | 9/1986 | Kikutani et al. | 431/351 |
| 4,869,665 | 9/1989 | Loppin | 431/351 |

*Primary Examiner*—Edward G. Favors
*Attorney, Agent, or Firm*—Paul M. Denk

[57] ABSTRACT

In a burner assembly for location within an air supply housing for a heater and disposed for inducing the movement of air through a blower and into and around a burner assembly during heater operation to create a supply of heated air for a space to be warmed, the burner assembly being of the type having opposite side walls, and upper and lower tiered baffles, each having connected thereon an air balancing baffle, forming cavities therebetween, with the combination of the air balancing baffles and tiered burner baffles forming a combustion chamber therebetween for reception and combustion of gas delivered from a gas manifold arranged approximately at the intake end of the burner assembly, with a shroud arranged above and below the upper and lower tier baffles for directing air into an intake at the back of the gas manifold, and for selectively diverting and directing air through the air balancing baffles, and through the burner baffles, into the combustion chamber. A diverter is arranged at the back end of the gas manifold for directing incoming air between the shroud and the upper and lower arranged tiered baffles, and deflectors are arranged at the upper front and lower front of the shrouds, to delay the passage of air into the path of the combusting gases, with the sides of the combustion chamber being flared outwardly, to minimize the development of combusting gas hot spots.

30 Claims, 3 Drawing Sheets

DIRECT GAS-FIRED BURNER ASSEMBLY

CROSS-REFERENCE TO RELATED APPLICATION

The subject matter of this application and invention is related to and comprises a continuation-in-part of the prior application having Ser. No. 07/240,150, filed on Sept. 2, 1988, U.S. Pat. No. 4,929,541, both of said inventions and applications being owned by a common assignee.

BACKGROUND OF THE INVENTION

The improved burner assembly of this invention is utilized in that capacity generally defined as a direct-fired gas industrial or related type of air heater. This type of heater is normally employed within an industrial complex, or a large space to be heated, and requiring large volumes of heated air to be added into the overall volumetric space to be heated, or to have heat supplementally added thereto, to attain an ambient temperature within the building that is comfortable for the purposes of its design. The invention herein is not a heat exchanger, since the combustion of the gas after its ignition takes place directly within the air stream being heated, and not by any conduction thereof. But, it is the improvement of the invention that further adds to the efficiency of combustion within an industrial heater of this design, so as to work most effectively, and safely, in producing the quantity of heated air that may be needed to warm the environs, and to effectively maintain a uniform and comfortable temperature within a predetermined volumetric space, as within a building, but at the same time, do so in a manner that does not sacrifice safety in heater design, during the performance of gaseous combustion in producing the source of heat. As a result, the heating equipment of this invention, in which the direct-fired burner of this type is enclosed, contains no flue, and all of the by-products of combustion are released directly into the heated air stream, which is then directly discharged into the space being heated, and as a result it is desirable, and one of the primary further advantages of this current invention, to provide improved means for reducing the creation and release of deleterious exhaust or other gases, either in the form of carbon monoxide, or nitrogen dioxide, that is discharged during the gas consumption. The improved heater of this design substantially reduces to a minimum the generation of these deleterious types of combustion by-products that may be directed into the space being heated, and certainly functions to alleviate the likelihood that any persons therein may be harmed through the breathing of such noxious gases over a sustained period of time.

Direct-fired gas heaters typically are constructed to a variety of configurations. In the majority of such heaters, as manufactured, the burner is arranged upstream of the fan inlet, and which functions in the manner of the draw-through type of arrangement. A number of other manufacturers position their burners downstream of the fan or blower discharge, in what is defined as a blow-through configuration An example of the latter can best be seen in the U.S. Pat. No. 3,630,499, which is owned by a common assignee of the improved burner of this current design.

Other types of burner arrangements that exist in the prior art can be readily seen in the U.S. patent to Ehrich, No. 3,485,043; in the U.S. patent to Coppin, et al, No. 4,573,907; in the U.S. patent to Childs, No. 3,993,449; in addition to the U.S. patent to Pillard, No. 3,885,919. Also, the Canadian patent No. 560,916, to Kind, shows a form of gas burner contained within a heating arrangement which incorporates a flame zone of a combustion chamber.

As is well known in this art, the performance characteristics of the burner necessarily determines the operational range of the heating equipment, when tested, to guage whether it is in compliance with the various requirements of the American National Standards Institute (ANSI), governing the functioning of the direct gas-fired industrial air heaters, of the type described in accordance with this invention. The burner design for which patent protection is sought herein is utilized in the industrial heating appliance, such as the identified direct gas-fired make-up air heaters and direct gas-fired industrial air heaters. This design may also be utilized in industrial process equipment, such as ovens or dryers. These appliance standards that exist for this type of equipment, when it is utilized for providing tempered replacement air as in a make-up air application or for providing space heating to overcome the heat loss in industrial buildings, are regulated by standards, and two of such standards which are generaly referenced by building code authorities are the ANSI standard Z-83.4, for the direct gas-fired make-up air heaters, and the ANSI standard Z-83.18, for the direct gas-fired industrial air heaters. These standards establish the criterian for the maximum increase allowed through the heater for the by-products of the combustion, such as the carbon monoxide, carbon dioxide, nitrogen dioxide, and aldehydes. Obviously, such controls are done for the purpose of regulating the air quality of the facility where the equipment is to be installed, for the safety of the worker, and others, subject to such type of heating conditions. Generally, the air flow through a heater of this type design, and the temperature rise that occurs for the air that is being heated, determines the heating capacity of the subject unit. The air flow is directly related to the fan as selected, the motor horse power of the unit driving the fan, and the static pressure on the system during its functioning. The temperature rise is controlled by the gas flow delivered to the burner, at the given air flow rate for the capacity of air that has been blown through the unit, as induced by the blower.

As previously explained, the ANSI standards generally provide an industrial self regulation of the minimum requirements that must be met by units of this design. These standards generally allow for specific maximum additive levels of four particular by-products of combustion, as previously identified, that may be released from the heating unit of this type during its functioning. These products of combustion, as previously explained, and their respective allowable levels are as follows:
carbon dioxide, 4,000 parts per million (ppm);
carbon monoxide, 5 parts per million (ppm)
nitrogen dioxide, 0.50 parts per million (ppm); and
aliphatic aldehydes, 1.0 parts per million (ppm).

The allowable rise concentration through the heater for carbon monoxide is this 5 ppm, and for nitrogen dioxide is 0.5 ppm. As can be understood, these are extremely small levels of elevation, and therefore, it is very important that a burner of this design be very efficiently and effectively designed, for the purpose of minimizing the derivation of these combustion by-products. These particular derived deleterious chemcial compounds, which are generally recognized in the trade as undesirable by-products from the functioning of heating units of this type, and their gases of combustion, are basically recognized as unwanted derivatives, which, if they can be reduced to an absolute minimum, not only adds to the safety of all people within the heated space, but enhances the quality operations of the heating unit, as designed. The unit of this particular invention has been designed to provide for a minimization of the output of these undesirable compounds, through the unique enhanced design of particular characteristics and features constructed into the improved heater of this invention, to attain such desirable results.

It has previously been determined through testing that there are three major factors that effect the production of carbon monoxide within the gas combustion production process. Ideally, the gas and combustion air needs to be mixed as completely and thoroughly as possible as soon after the gas is introduced into the burner assembly. On the other hand, the quantity of air delivered must be at that level which induces effective controlled combustion, to provide maximum heat, without generating hot spots within the burner assembly, and more specifically its combustion chamber. If too little air is entered into the combustion chamber of the burner, then incomplete combustion occurs, and noxious gases can escape into the heated environment. This raises the level of carbon monoxide output, which could easily be measured in the discharge air stream. On the other hand, if too much combustion air is introduced at the low and medium fire combustion zone, quenching of the flame can occur, and this abrupt cooling also causes incomplete combustion All this can produce the undesirable type of deleterious by-products, as previously explained Thus, an equilibrium point desirably must be attained and maintained with respect to how much air is introduced into the burner, in combination with the amount of gas discharged from the manifold, and the location in emplacement of the air intake into the combustion zone.

An additional factor which effects the development of carbon monoxide in the burning process is also related to this quenching feature of the flame, but in this particular case, with respect to this heater, the concern is with the abrupt cooling of the flame after it exits from the burner. In units of this type, the discharge air leaving the fan or blower results in a greater volume of air being forced around the burner compared to that entering the combustion zone. With the burner downstream of the blower, the burner acts as a restriction to the flow of air, thereby compressing the air, causing the velocity to increase as it passes the burner. Once the restriction is passed, the large volume of air from the upper and lower portions of the duct expands rapidly to equalize pressure within the duct causing the cool air to impinge the flame tips that are extending beyond the end of the burner. This type of air impingement causes a quenching of the flame in prior art type of devices, and has significantly increased CO output.

The manner in which the air is introduced into the burner, as through arranged orifices, is a factor which is just as important as to how much air is introduced into the same. It has been found that the output level of carbon monoxide can readily be reduced limiting the amount of combustion air early in the burner, near the gas ports, and supplying more air later, or further downstream, within the burner assembly. This invention envisions the usage of diverter means to assure that a greater supply of the air is delivered downstream from the burner manifold, than that which enters into the combustion chamber just proximate its manifold. Thus, combustion takes place early in the burner at low combustion rates. With high combustion rates, as when an abundance of gas is introduced through the manifold, such combustion takes place more thoroughly throughout the whole burner assembly and more downstream from the intake gas manifold. Therefore, at lower combustion rates, less gas and less air will by necessity be needed to support such combustion. Also, at higher combustion rates, when more air is needed, it is preferably supplied more downstream in the burner assembly.

The current invention has been designed to take into consideration these various features, and to not only regulate the amount, capacity, and particularly location of the quantity of gas being ejected from the manifold into the chamber of combustion, but likewise, to provide for the adequate regulation in the delivery of air into the combustion chamber, the proper placement of its positioning, all within the area of combustion, and to inject the adequate amount of air to augment combustion, at particular locations, and to specific amounts, in order to enhance the efficiency of combustion, and thereby reduce the development of noxious gases released as exhaust from the heater assembly.

In addition to the foregoing, the subject matter of this invention further contemplates modifications to the structure of the burner embodiment, and more specifically its various formed chambers, in order to minimize the amount of heat exposure of the various walls and chambers, in addition to adding modifications, in the form of air balancing baffles, to select baffled tiers to better isolated areas of desired maximum combustion, to reduce the development of hot spots upon the various structured walls, and thereby, and which has been found through experimentation and research, to favorably reduce the development of nitrogen dioxide, and its emisions, from the burner of this invention during its functioning.

SUMMARY OF THE INVENTION

The subject matter of this invention contemplates modifications to the structure of pre-existing burner designs of this type, which is previously explained, one of which is generally shown in the U.S. Pat. No. 3,630,499, as owned by a common assignee to this invention, in addition to the structure of the burner assembly disclosed in the parent patent application for this invention. As can be readily seen in these earlier devices, that burners of this type are generally fabricated of a pair of walls, upper and lower tiers of air admitting surfaces, in order to form a combustion chamber, and which arranges a manifold at its intake end, in order to inject adequate supplies of gas into the combustion chamber, which in combination with the entering air, forms the source of combustion for heating of the supply of air forced through the burner assembly, and the duct or housing in which the burner, and its blower, locates. The main components of the burner of this current design, as improved, include its baffles, which have been rearranged and reconstructed, particularly where located in proximity with the gas manifold, in order to provide for a more controlled delivery of air entering into the area of combustion, within the combustion chamber. The addition of air balancing baffles connected in conjunction with the upper and lower tiered baffles of the combustion chamber, as formed, further add to the convenient regulation in the delivery and flow of air into the combustion chamber, during its functioning, not only for the purpose of reducing inefficient burning, and thereby reducing its output of deleterious gases of exhaust, but likewise, to reduce the formation of hot spots, which can generate some of the types of noxious gases, as previously identified.

Furthermore, in addition to utilizing air balancing baffles to regulate the entrance of air into the vicinity of the combustion chamber, along its arranged length, it is just as important, as applicants have found, to provide means for diverting the quantity and capacities of air that are directed through the air balancing baffles and into the combustion chamber. To achieve this, it has been found desirable to supply lesser quantities of air into the combustion chamber proximate its manifold, and in addition, to deliver greater quantities of air downstream therefrom, in order to reduce the generation of hot spots, as previously explained, and the undesirable development of carbon monoxide, and the like. To accomplish, diverter means is supplied within the entrance area of the air stream, near the manifold, so as to direct, through its arranged flanges, a greater quantity of the passing air along the air balancing baffles more downstream to the combustion chamber, than the air which is allowed to enter through the air balancing and tiered baffles into the combustion chamber just proximate the gas delivering manifold.

The manifold, which introduces the supply of gas into the burner, has had its output ports or gas orifices uniquely designed, as explained in this and the parent application, generally through empirical testing, to determine the exact amount and desired quantities of gas to be strategically injected into the the area of combustion, in order to attain efficient combustion, and to reduce the development of carbon monoxide, for the reasons as previously explained. In addition, the sidewalls of the burner assembly have been redesigned, in the manner as previously explained, in the earlier application, and formed principally in an arrangement that achieves their flaring, gradually outwardly, away from the area of combustion, so as to minimize and reduce their direct exposure or proximity location to the origin or center of the area of gaseous combustion, and therefore, reduce, if not significantly eliminate, the generation of hot spots, as at the vicinity of these sidewalls, which normally induce the creation of nitrogen dioxide, which is another of the undesirable exhaust by-product, in older burner designs, that must be avoided, in order to provide more efficient delivery of cleaner heat to the building being warmed. In addition, a plurality of extensions are provided particularly at the upper front and lower front regions of the burner chamber, in order to reduce the amount of downflow or upflow, respectively, of air, at these locations, as it is forced by the blower around the burner chamber, and into the mainstream of airflow within the duct, where it combines with the heated air for eventual discharge into the space to be heated.

Normally, in the existing burner designs, since the usual blower utilized in conjunction with gas air heaters tends to create a greater volume of air within its upper region of the duct, than that which is induced in the lower region, there is a need to direct this flow of pressurized air around the combustion chamber. Through the usage of this type of extension, as previously explained, the pressurized air is effectively prohibited from becoming entrained with the heat of combustion, so as to reduce any abrupt cooling of the flame tips that may extend towards or beyond the end of the combustion chamber, to provide a maximum mixture of heat and passing air, as it traverses from the heater assembly, and moves downstream for delivery into the room or building being warmed.

Another significant improvement of this invention, is the addition of those air balancing baffles that connect to the tiered upper and lower baffles that normally form the combustion chamber, of the type as previously explained in the identified earlier parent application. The addition of these air balancing baffles, in combination with the upper and lower tiered baffles, form multiple cavity arrangements that have been found to substantially reduce any warpage that may occur proximate the gas manifold, during sustained heater operations. In addition, the use of air balancing baffles has been found to provide for adequate penetration of the combustion air into the vicinity of the flame during high firing rates. Furthermore, the usage of air balancing baffles, incorporating predesigned slots, that regulate and control the amount of air passing into the combustion chamber, has been found to significantly reduce warpage of those burner baffles normally arranged in the lower tiers and in more proximity to the gas manifold, during heater functioning. Additionally, further problems resolved through the usage of the predesigned baffling arrangement, and air balancing baffles, of this invention, is to reduce the quenching of the flame tips that burn beyond the end of the burner, by means of controlling and regulating the quantities of air being delivered into the combustion chamber, along the length of the tiered baffles, so as to regulate the volume of air that enters therein, from both the top and bottom segments of the burner, for the purpose of affording more efficient burning, better regulation of heat, reduction in the generation of hot spots, particularly during prolonged operations of the burner of this improved design.

As previously explained, better control of the flame of combustion reduces the generation of undesirable combustion by-products. It does so with significant restrictions placed on the length of the burner as a result of the burner location downstream of the blower in relation to its output capacity. To demonstrate the magnitude of the improvements attained through this current design, one only need compare the ratio of the output capacity of this improved burner with respect to its burner length. Other manufacturers who supply burners to the industry provide incremental lengths of burner sections which have uniformed incremental output capacities, for example, that is, they provide burner sections in 12 inch increments and rate its output at 600,000 BTU's per hour for each section of the burner. This equates to 50,000 BTU's per hour per inch of burner. The burner used in combination with the improvements of this current invention, as presented and described herein, has been certified through testing to have an output of 143,750 BTU's per hour per inch of burner. In order to achieve this increase in output rate, the improvements of the type as summarized herein, and as to be subsequently described, were required to be modified into the burner design in addition to other improvements as will be reviewed.

The various objects and advantages of the present invention will become more apparent to those skilled in the art upon reviewing the foregoing summary, and upon undertaking a study of the description of its preferred embodiment, in view of the drawings.

DESCRIPTION OF THE PREFERRED EMBODIMENT

Figure 1:
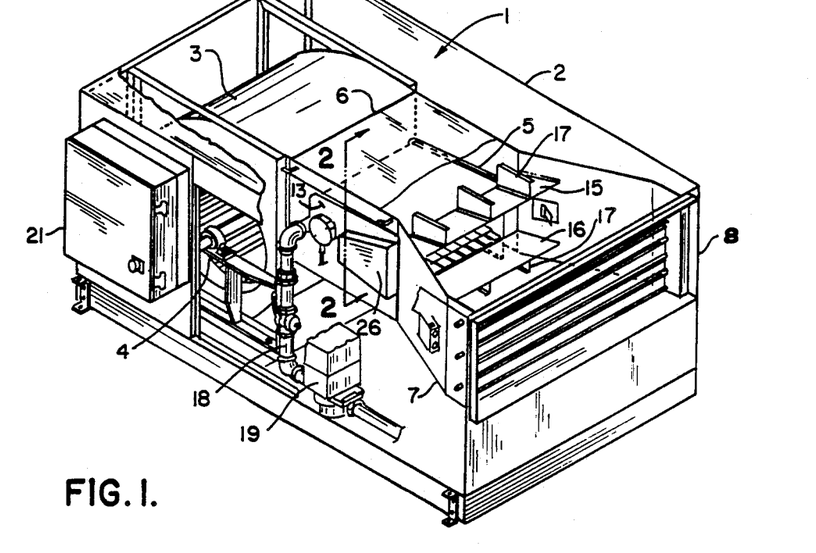
FIG. 1 is isometric of the housing and ductwork encasing the blower and burner assembly of this improved invention.

In referring to the drawings, and in particular FIG. 1, there is shown the heater 1 of this invention, which, as disclosed, includes a housing 2, that is generally formed in conjunction with, and locates within, arranged duct work used for conveyance of air to and from the heater of this invention. A blower 3 may be operated through the usual motor (not shown), which causes the blower rotation, and through the movement of its vanes, as at 4, induces a volumetric flow of air through the housing, and the burner or air heater of this invention. This type of heater usually may be mounted upon the roof of a building, or perhaps just interiorly thereof, or just inside of an outside wall, to induce the intake of outside air, heat it, and then discharge it into a specified space, generally within an industrial or other commercial building, to attain a warming or make-up of internal air thereof for the comfort of its occupants.

The burner assembly, as at 5, is arranged just forwardly of the outlet 6 of the blower, in a manner that is well known in the art, and functions to provide for combustion of gas to furnish direct heating of the flowing air, for purposes as previously described. Provided forwardly of the blower assembly is additional duct work, as at 7, and which has an outlet for discharging of the heated air, when mixed with additional air bypassing the burner and forced therealong through operations of the blower, with the combined air to be discharged into the environment to be warmed. Such air is discharged from the opening 8, provided at the front of the housing 1 of the heater assembly.

Figure 2:
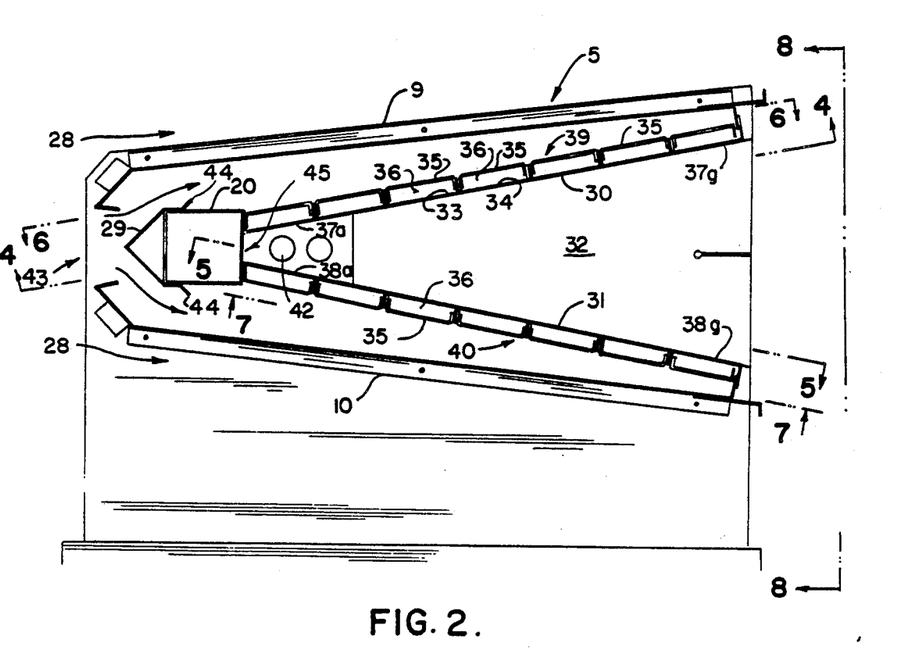
FIG. 2 is a sectional side view taken generally along the line 2—2 of FIG. 1.

The burner assembly 5, as can be seen in FIG. 2, includes an upper and lower shroud, as at 9 and 10, respectively, and which incorporates side walls, as at 13 and 14. Upper and lower deflectors, as at 15 and 16, respectively, mount extending from the front edges of the upper and lower shrouds, and are connected to and within the duct work 7 of the housing 2 by means of Z-braces, as shown generally at 17. This provides spacing between the duct, and the formed burner assembly, that allows the unheated air as forced along by the blower 3 to exit from the front of the deflector assembly, and thereby intermix with the air that is heated through the gases of combustion that are formed within the burner 5, as will be subsequently described. It is this combined air that discharges from the front 8 of the heater assembly, for delivery to the spacing to be warmed. The purposes of these deflectors 15 and 16, as previously reviewed, are to allow the air passing from the blower 3, or at least that air passing along the upper and lower shroud surfaces 9 and 10, to be delayed in its discharge into the path of the heated combustion gases produced by the burner assembly 5. As a result, equality of volume of air passing around the burner assembly 5 in both its upper and lower regions are maintained, and hence have a tendency to cause a more thorough intermixing of the cool outside air, and the hot gases of combustion, to be uniformly mixed as the higher pressure air expands and equalizes in the duct work, so as to provide thorough intermixing, without quenching the flame tips of the combustion gases, which is an undesirable feature in prior art devices in the manner as previously explained. The arrangement of these upper and lower deflectors delays the expansion of the flowing air about the end of the burner shrouds, so as to prevent the quenching of the flame as it exits proximate this location of the burner assembly.

There is also disclosed in this structure the gas intake pipe 18 adequately controlled by means of the shut-off valve 19 for use for delivery of the combustible gas to the gas manifold 20, as can be seen. Also provided upon the housing is an electrical junction box, and electronic controls, as at 21, that provide adequate control of the operations for this heater assembly, and its structured associated blower.

Figure 8:
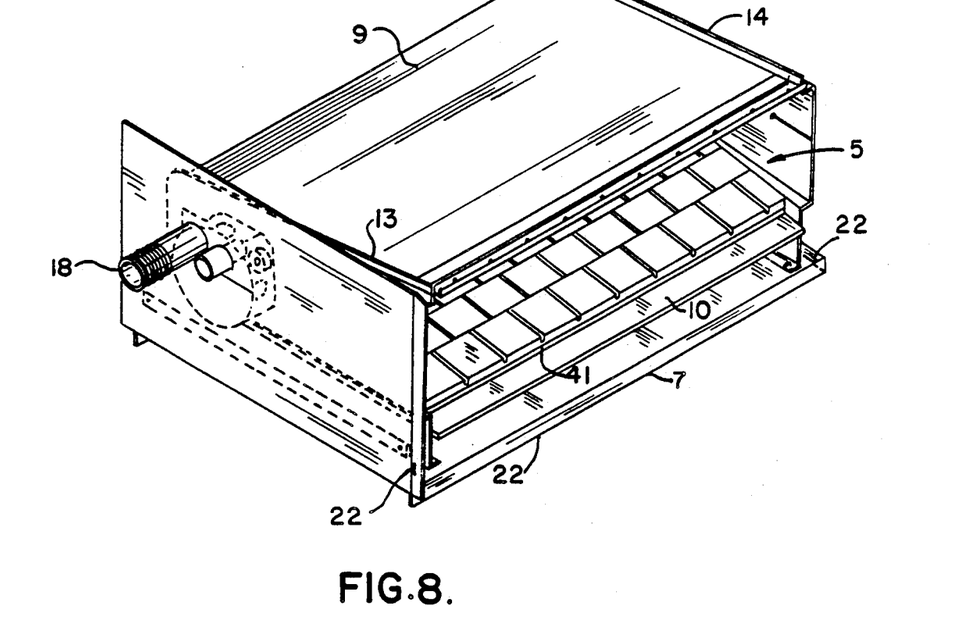
FIG. 8 is a isometric view of the burner assembly removed from its housing and duct work, as shown in FIG. 1.

As can be seen in FIG. 8, burner assembly 5 mounts by means of the flanged connection, as at 22, to the proximate bottom wall of the duct work 7 of the heater assembly. Additional flange means (not shown) may be provided at the top or sides of the burner assembly, to achieve its stability in installation.

Figure 9:
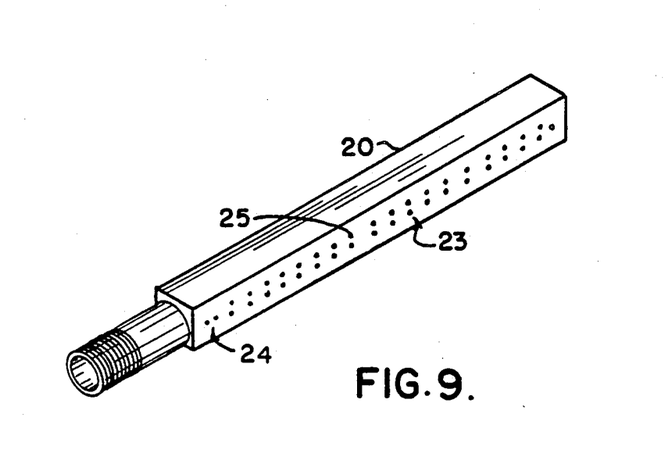
FIG. 9 is an isometric view of the gas manifold of this invention, showing the arranged and staggered gas discharging orifices of said manifold.

The burner assembly includes its formed sidewalls 13 and 14, and incorporates therein its gas manifold 20, that extends from side to side of the burner assembly, receiving its charge of combustible gas from the intake pipe 18, as previously explained. As noted in FIG. 9, the discharge ports provided through the gas manifold may be of varying dimensions, with there being smaller and lesser dimensioned openings provided at the proximate side edges of the manifold, than the discharge ports arranged more inwardly thereof. In the preferred embodiment, the ports 23 may be of the same dimension. In addition, dual rows of discharge ports 25 may be provided within the gas manifold, inwardly from its side edges, as can be seen in FIG. 9. Furthermore, it may be desirable to space various of the inwardly arranged ports further apart, than at other locations along the gas manifold, although in practice, it has been found that a manifold formed equally divided into relatively small spaces, along its width, with each pair of vertically aligned apertures being arranged horizontally apart on one inch centers, is most effective. Each of the apertures may vary in diameter, comprising dimensioned discharge ports varying between 1/16 of an inch to ¼ inch in diameter, although apertures of 0.140 inch in diameter are most desirable. Each pair of vertically aligned apertures are arranged approximately ½ inch vertically apart, above and below the burner's horizontal center line. A pair of smaller apertures or discharge ports 24 may be provided at the ignition side of the gas manifold for the purpose of providing improved direct ignition of the burner flame and flame sensing hardware or control.

The purpose of varying the number of discharge ports, particularly laterally of the gas manifold, is for the purpose that it has been found desirable to control the capacity of the gas discharged into the combustion chamber, and to reduce the amount of gas entering into the chamber at approximately the side edges of the manifold, in order to minimize the development of hot spots along the side walls of the combustion chamber, and thereby likewise decrease the amount of nitrogen dioxide generated during combustion.

Figure 3:
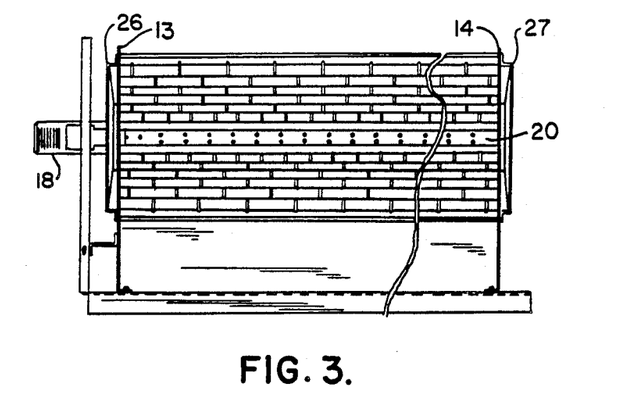
FIG. 3 is a sectional front view of the burner assembly of this invention.

As can be further seen in FIGS. 1 and 3, the sidewalls 13 and 14 of the combustion chamber each incorporate flared extensions, as at 26 and 27, and these flared extensions provide greater spacing laterally of the combustion chamber, to expand outwardly the walls for such chamber, and thereby reduce the potential for the development of hot spots, along these walls, as has occurred in prior art type of burners. As previously reviewed, the side walls for earlier burner assemblies had a tendency to undesirably create a greater quantity of nitrogen dioxide, during heater operations, because of the generation of overheated surfaces in proximity of their sidewall structures. As can be seen, these flared extensions are of lesser dimensions at their back ends, as at the location of their back walls, rather than at their front edges, as can be noted. This provides a greater volumetric spacing and clearance as the heated combustion gases move forwardly under the force of the passing air, during a burner functioning. These wall extensions may be flanged for facilitating their mounting to the assembly walls 13 and 14, but likewise, could be stamped into the side walls during their formation.

In referring once again to FIG. 2, the burner assembly 5 is arranged within its ductwork, formed by its upper and lower shrouds 9 and 10. It includes its gas manifold 20, and air is diverted into the burner assembly by means of the shroud inlet, as at 43. Or, air may be diverted around the same, as at 28, within the ductwork 7 of the housing 2. Obviously, air traveling the path 28 is diverted by means of the deflectors 15 and 16 to eventually become entrained into the path of the air being heated within the burner assembly 5. The intake end 43 of the shrouds generally extend from side to side of the burner assembly, and has an intake dimension, heightwise, of approximately two or more inches in dimension. A diverter 29 is arranged along the back of the gas manifold 20, and effectively diverts the incoming air to pass either above or below the said manifold, as depicted by the air flow arrows showing the pattern of current, and provides for passage of the air within the shrouds, and for their eventual processing by the upper and lower tiered baffles 30 and 31, respectively, and eventually into the location of the combustion chamber, as at 32, where the gas combustion takes place, as during functioning of this heater assembly.

As can be seen in FIG. 2, the combustion chamber is formed by the upper and lower tiered baffles 30 and 31, in addition to the side walls 13 and 14, as flared at 26. In the formation of the tiered baffles, they are provided for furnishing a selective transfer of the pressurized air, delivered by the blower, into the combustion chamber, with some degree of significant control as to its delivery and capacities. It is desirable to carefully regulate the entrance of air into the combustion chamber, so as to have adequate control and proper proportioning of the ratio between the air as mixed with the gases, along the length of the combustion chamber, in order to assure both efficient and maximum combustion, and to reduce, at this location, the development of carbon monoxide, as explained. These tiered baffles are formed of a series of channel like means, such as shown at 33 and 34, which extend the width of the combustion chamber, with a series of these arranged channel means being connected together, along their sides, along the length of the baffles 30 and 31, in order to form this segment of the combustion chamber In addition, each of the upper and lower tiered baffles 30 and 31 have a series of air balancing baffles, one as shown at 35, mounted thereon, also throughout the length of the formed combustion chamber, with each air balancing baffle, also extending the width of the combustion chamber, forming a cavity, as at 36, between it and the associated channel 33, or 34, as can be seen in this FIG. 2. Thus, the upper and lower tiered baffles 30 and 31 are formed of a series of transversely arranged cavities, through their cooperating air balancing baffles 35, arranged in alignment, along the length of the formed combustion chamber, so as to create a distribution channel for combustion air.

Figure 4:
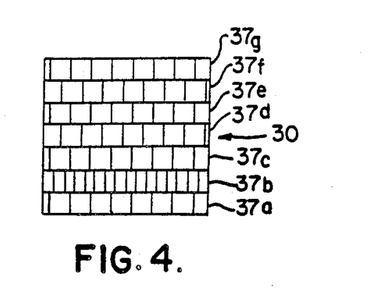
FIG. 4 is a schematic view of the slotted upper tiered baffles of the burner assembly taken along the line 4—4 of FIG. 2.

More specifically, these various air balancing baffles and upper and lower tiered baffles include a series of openings or apertures provided therethrough, to provide for a precise control of the delivery of select capacities of air into the combustion chamber, along the length of the burner assembly FIG. 4 discloses the pattern of openings, arranged as slots, formed through the upper tiered baffle 30, and as can be seen, this tiered baffle includes a series of seven rows of tiered baffles, containing arranged slots, in its configuration. The lower row of slots, as at 37a, is arranged closest to the gas manifold 20, while the upper row of slots, as at 37g, is arranged downstream at the deflector end of the combustion chamber. Likewise, as disclosed in FIG. 5, the arrangement of the rows of slots provided through the lower tiered baffle 31 is shown, with the row of slots at 38a being arranged closest to the gas manifold 20, while the row of slots 38g is arranged downstream of the burner assembly and where it discharges into the ductwork and eventual release from the housing.

Figure 5:
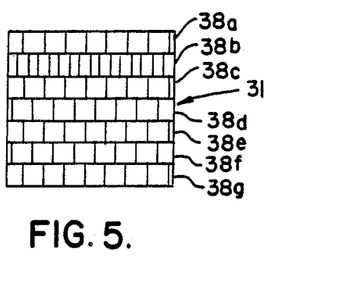
FIG. 5 is a view of the slotted lower tiered baffles forming the combustion chamber taken along the line 5—5 of FIG. 2.

Generally, the slots provided through tiers 37a and 37c, and 38a and 38c, are formed at approximately 0.062 inches width, and two inches on center with respect to each other. The slots provided in tiers 37b and 38b are likewise formed at approximately 0.062 inches in width, and space approximately one inch apart. The slots provided in tiers 37d through 37g, and 38d through 38g, are formed at a width of approximately 0.125 inches, being spaced approximately two inches apart. And, as can be readily seen, these various slots in the select tiers throughout the upper and lower tiered baffles are staggered, in order to provide uniformity in the flow of predetermined capacities of blower delivered air into the combustion chamber 32 during functioning of the heater assembly.

Figure 6:
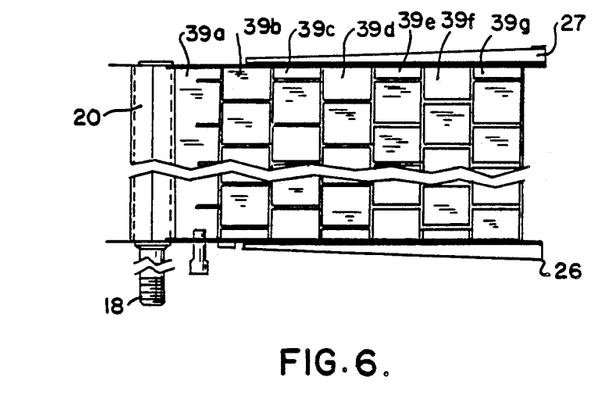
FIG. 6 is a view of the upper air balancing baffles taken along the line 6—6 of FIG. 2.
Figure 7:
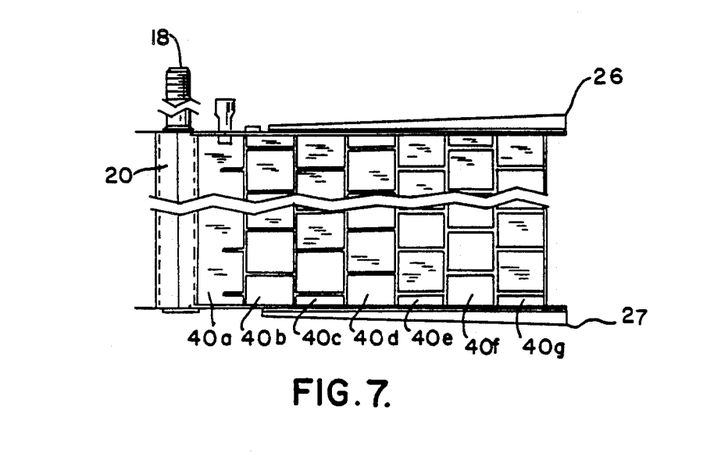
FIG. 7 is a sectional view of the lower air balancing baffles taken along the line 7—7 of FIG. 2.

In addition, the air balancing baffles are also disclosed. FIG. 6, as previously explained, discloses the slot arrangement provided through the upper baffle 39, while FIG. 7 discloses the formation, arrangment, and location of the slots provided through the lower air balancing baffle 40. More specifically, and through an empirical derivation, it has been determined that the slots provided within the air balancing baffles 39a and 40a are approximately 0.062 inches in width, and are approximately one inch in length, extending only approximately one-half the length of the baffle, and are spaced at two inches apart along their slot center lines. The openings or slots provided within the air balancing baffle tiers 39b and 39d, in addition to 40b and 40d, are formed approximately 0.093 inches in width, extend the length of the tier, and are arranged on two inch slot center lines apart, as can be seen. The openings or slots provided in tiers 39c and 40c are approximately 0.125 inches in width, and arranged on two inch slot center lines apart. The slots provided in tiers 39e and 40e are formed approximtely 0.187 inches in width, and are arranged on two inch center lines apart. The slots provided in tiers 39f and 39g are formed preferably at 0.25 inches in width, and are arranged on two inch center lines apart. The same dimensions prevail in tiers 40f and 40g. And, as can be readily seen, all of the formed slots within the tiers of the air balancing baffles are staggered, in the arrangement and patterned as shown, so as to more properly and adequately regulate the flow and delivery of air into the combustion chamber, during its functioning.

The reason for the empirical derivation of the arrangement of the various slots within the upper and lower tiered baffles, and the upper and lower air balancing baffles, and in conjunction with the spacing, as at 45, between the upper and lowered tiered baffles, is that without adequate design, severe wrappage can occur to the gas manifold. This has been found to be a function of the distance of the separation of the first tier of baffles at their interface point to the gas manifold. During initial development, the tiered baffles were arranged on approximate two inch spacings. During low fire operation, the flame was being directed back onto the manifold, which caused it to overheat. It was detected that with larger baffle spacing, there is an air circulation pattern in the direction of the manifold, rather than along the forward direction of the combustion chamber. This air pattern was opposite of the direction of air flow within the ductwork. It appeared to generate a negative pressure created by the high velocity of the air going around the burner or heater assembly, which created air patterns or air venturi patterns particularly during low firing conditions, which were stronger than the combusted air and gas volumes being forced into the combustion zone, during heater functioning. It was determined through trial and error that this baffle spacing 45 at the vicinity of the manifold, was desired to be at an optimum distance of approximately 0.875 inches in height.

During the empirical derivation of this burner arrangement, another problem was discovered which related to the combustion air not penetrating the high fire flame within the combustion chamber which resulted in higher $NO_2$ and CO creation. The volume of gas created an air curtain effect which the combustion air could not penetrate at the far or discharge end of the burner, or burner assembly Opening the burner primary 43 thereby allowing more air to enter into the combustion zone helped alleviate this condition, but yet it created hot spots in the vicinity directly opposite from the slots in the baffle tiers 37a and 38a through 37e and 38e within the upper and lower tiered baffles. The solution to this problem became complex, and required several variations of design changes to overcome the same. It was obvious to the inventors that they needed more air at the vicinity of these tiers 37e and 38e, to obtain a proper air and fuel mixture so as to break up that gas curtain effect through further augmented burning of the gas at this location between the tiered baffles, within the combustion chamber. Increasing of the slot sizes, at these locations, as previously reviewed, broke up the gas curtain effect. However, such again had the effect of driving the generated combusting flame towards the opposite baffle, which caused flame impingement upon each opposite baffle, upper and lower tiered baffles, again resulting in hot spots. These hot spots further contributed to higher $NO_2$ levels, and achieved wrappage of the baffles at these locations. Hence, the solution to the problem was to add these upper and lower air balancing baffles 39 and 40, that allowed for a control of both the velocity of the air and the volume of the air, as it was delivered to the upper and lower inner tiered baffles 30 and 31. This arrangement yielded the side effect of spot cooling of these upper and lower tiered baffles, immediately below their slotted openings in the air balancing baffle, and attained a more proper delivery of balanced air into the combustion chamber. This new arrangement provided for a fine adjustment of the delivered combustion air, it provided for an increase of delivered air, at a reduced velocity, because of the larger slots within these tiers, providing for a more balanced delivery of air into the combustion chamber. This arrangement of slots at greater width dimensions was followed throughout the remaining tiers 37f and 37g, and 38f and 38g, to provide for balanced baffle delivery of air at combinations that metered the combustion air requirements to match the firing rate of the gas manifold, in relationship to the burner length. The problem of flame impingement on the upper and lower tiered baffles 37a and 38a through 37e and 38e, and the associated hot spots generated thereat, was minimized through this method of control in the construction of this arrangement for the slots via the various air balancing baffles.

To further reduce the hot spots on the tiers b, of the tiered baffles, the spacings of their slots were reduced to one inch centers on the burner baffle, while the air balancing baffle slots, at b, were maintained at two inch centers. This was another way to accomplish the velocity reduction at the burner baffle and the volume reduction of the air balancing baffle at this location for the combustion chamber. It should be noted that in this case, more slots were utilized of the same and lesser slot width rather than increasing the width of the slots through the baffles at this tier b. The elimination of hot spots at this location within the tiered baffles resulted in improved $NO_2$ performance and reduced baffle warpage.

In our previous application, we had disclosed and designed the first burner baffle tier, as at a, as a solid baffle with minuscule orifices. With the extreme heat that develops in the burner, usage of a solid burner baffle, at this location, was found to be subject to warpage. Full length slots were required to correct this condition. Very little combustion air is required at this particular tier, so the air balancing baffle was provided with a partial slot only, as in their tiers a, to regulate the volume of air provided. Obviously, this feature could have been accomplished equally well through the use of holes or apertures.

Generally, the remaining sized slots, and their spacing apart, from center line to center line of each slot, were empirically derived to provide optimum combustion capacities within the combustion chamber of the heater assembly. The arrangement of such slots, both through the tiered baffles, and the air balancing baffles connected thereto, were designed principally to provide reduced warpage, and to allow for some expansion to take place in the baffle structures. For example, in tier a, and particularly in the air balancing baffles, the 1/16 inch slots, which are actually shown as half slots, arranged on two inch centers, are provided to cool this baffle with a limited amount of combustion air so as not to quench the low fire flame, nor drive the flame across to overheat the opposite burner baffle. These half slots are located only on the top side of the air balancing baffles, in an attempt to keep the combustion air as high in the tier a area as possible.

In tier b, of the burner or tiered baffles, the one-sixteenth inch slots are arranged on one inch centers to reduce hot spots and minimize warping by allowing the air to pass through an increased number of slots at a lower velocity so that the flame as generated was not driven across the burner and allowed to heat up the tiered baffle on the opposite side. On the other hand, the air balancing baffles in tier b has a 3/32 inch full slot, arranged on two inch centers. These slots are larger, because they are located in an area of low combustion air flow because of the diverter design. These slots deliver a limited amount of combustion air in the center of the two smaller slots provided upon the underlying burner or tiered baffles, at b, for the purpose of helping to cool the burner baffles at these locations.

The tiered or burner baffles in the c tier are one-sixteenth inch slots, on two inch centers, for the purpose of controlling quenching of the combustion flame in the forty to sixty degree rise range. The air balancing baffles within this tier c have the previously identified slots, on two inch centers, which are arranged to deliver the cool combustion air in the center of the solid areas of their burner baffles arranged therebelow. This area of the burner also has low combustion air flow as a result of the design of the diverter as through 43 and at 29. The tiered or burner baffles at d include a series of 150 inchslots on two inch centers, and help to force more air into the combustion chamber for the purpose of penetrating the flame and to break up the gas curtain effect which would otherwise form at higher gas flow rates. The air balancing baffles at tier d have 3/32 inch slots at this location because of the diverter design which causes the combustion air to impact within this area. A larger slot size was determined to cause quenching of the flame and generated hot spots on the burner baffle areas on the opposite tier burner baffle at this location. The tiered or burner baffles at tier e include the ⅛ inch slots, as previously explained, arranged on two inch centers. These have a tendency to force more air into the combustion chamber and to penetrate the generated flame. The air balancing baffles at e are designed, as previously stated, arranged on two inch centers, and effectively deliver a higher combustion air volume for the purpose of providing more air at the higher firing rates generated at this location. The high flow rate of the combustion air at this location provides significant cooling of the upper burner or tiered baffles at this location. The burner baffles at tier f include the ⅛ inch slots on two inch centers, for the purpose of forcing more air into the combustion chamber, and to penetrate the flame of combustion generated at this location. This helps to minimize the flame length that would otherwise be present and extend too forwardly of the burner assembly. The air balancing baffles at this tier are designed as previously explained, on two inch centers, and deliver the higher combustion air volume required at the higher firing rates when the heater is turned up for functioning to deliver heat at higher capacities. The high flow rate of the combustion air provides significant cooling of the upper burner baffles at these locations. The burner baffles within tier g, which are furtherest remote from the gas distributor or manifold, are designed as previously explained, and are provided to force more air into the combustion chamber and penetrate the flame at this location. Once again, this helps to minimize the flame length that would otherwise be present. The air balancing baffles at this location g are formed as explained, and are designed to deliver the higher combustion air volume required at the increased firing rates for operation of the heater assembly. It has been found that the higher flow rates of the combustion air at this location provides significant cooling of the upper burner baffle particularly when the heating assembly is being operated at higher capacities.

As can be seen in FIG. 8, the slots provided through the burner or tiered baffles are actually cut along their full length, and extend slightly downwardly into the front wall as at 41, of each arranged baffle.

The diverter design 29 is provided to furnish two purposes. First, it splits the combustion air entering into the back of the shroud, as at 43, and delivers it above and below the burner assembly, along their air balancing baffles 39 and 40. Secondly, the raised flange ends 44 of the diverter 29 creates an air pattern which directs the vast majority of the passing air to the forwardmost sections of the burner where it is most needed.

Another additional design change for this burner assembly is the addition of that lower deflector plate 16 within the structure. This was added to the bottom end of the burner assembly to keep the air going around the bottom of the burner from rising rapidly and abruptly cooling the flame tips extending beyond the end of the combustion chamber 32. The reason for this is that it was necessary in this application that the burner be positioned in a significantly higher velocity air stream than in previously developed designs. In the prior designs, the combustion chamber was in a high negative pressure area which caused the air going around the burner to collapse to the low pressure area at its first opportunity. The addition of this lower extension 16 eliminated this quenching effect that had primarily been observed when only a top extension was used.

In addition, in this current design, there are seven tiers provided in the baffle arrangement, with the addition of the air balancing baffles, compared to the five tiers provided in the parent design. The addition of two extra tiers were found required for the purpose of injecting the additional volume of combustion air required. In addition, two rows of burner orifices are located within the burner or gas manifold. The same size of orifices are generally utilized throughout the length of the manifold, with the exception in the area of the ignitor 42. Using a smaller diametered orifice within the gas manifold has a tendency to even out the gas flow, throughout the extent of the gas manifold, so that different sized orifices did not need to be utilized, as shown in the parent design. Although, it is just as likely that varying the orifice size may even yet provide further refinement to the delivery of the combustion gas to the combustion chamber, during operations of this burner assembly.

Variations or modifications to the structure of this burner assembly may occur to those skilled in the art upon reviewing the subject matter of this invention.

Such variations or modifications, if within the spirit of this invention, are intended to be encompassed within the scope of any claims to patent protection issuing upon this invention. The description of the preferred embodiment provided herein is set forth for illustrative purposes only.

Having thus described the invention, what is claimed and desired to be protected by Letters Patent is:

1. In a burner assembly for location within an air supply housing and ductwork for a heater and disposed for inducing the movement of air through a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises, said gas manifold having a series of gas discharge ports provided along its length, and said upper and lower tiered baffles forming said combustion chamber, and said tiered baffles having air balancing baffles connected thereon, and both said tiered and air balancing baffles having arranged openings therethrough to regulate the flow of air through the baffles and thereby control the degree of burning within the formed combustion chamber.

2. The invention of claim 1 and wherein said discharge ports of the manifold being of varying sizes.

3. The invention of claim 1 and wherein said discharge ports of the manifold being of approximately the same size.

4. The invention of claim 1 and wherein said gas manifold arranged in proximity with an ignition source and extending approximately from side to side of the combustion chamber, and said varying sized discharge ports having smaller dimension at those ports arranged at the side nearest the ignition source of the said manifold to larger dimensioned ports provided more inwardly thereof.

5. The invention of claim 4 and wherein said dimensioned discharge ports varying between about 1/16 inch to ¼ inch in diameter.

6. The invention of claim 1 and wherein said upper and lower tiered baffles each formed having a series of adjacently arranged tiers and wherein said openings comprising a series of slots therein for introduction of air into the combustion chamber during burner operation.

7. The invention of claim 6 and wherein said openings provided through the air balancing baffles connected to the upper and lower tiered baffles comprising a series of slots therethrough for introduction of air into the combustion chamber during burner operation.

8. The invention of claim 7 and wherein a cavity formed between each upper and lower tiered baffle and its connected air balancing baffle provide for the distribution of combustion air.

9. The invention of claim 8 and wherein the slots provided through the air balancing baffles connected to the upper and lower tiered baffles arranged next adjacent to the gas manifold comprising shortened slots directing a lesser quantity of air towards the combusting gas within the combustion chamber during heater functioning.

10. The invention of claim 9 and wherein said slots provided through the other tiers and air balancing baffles being elongated slots extending longitudinally of the burner assembly.

11. The invention of claim 10 and wherein said slots of the air balancing baffles being staggered from the slots in the tiered burner baffle to which it is connected.

12. The invention of claim 11 and wherein said slots in one row of arranged air balancing baffles being staggered from the slots in the next adjacent row of air balancing baffles.

13. The invention of claim 12 and wherein the slots provided through the upper and lower tiered baffles being of varying widths with respect to the slots through the tiered baffles arranged closer to the gas manifold.

14. The invention of claim 13 and wherein the slots provided through the air balancing baffles are of varying widths.

15. The invention of claim 10 and including a deflector connecting with the proximate upper front of the burner assembly and extending from approximately the forward end of the upper tiered baffle and providing for delaying and controlling the discharge of the flowing air passing through and above the burner and to the front of the burner assembly during functioning of the heater.

16. The invention of claim 10 and including a deflector connecting with the proximate lower front of the burner assembly and extending from approximately the forward end of the lower tiered baffle and provided for delaying and controlling the discharge of the flowing air passing through and below the burner and to the front of the burner assembly during functioning of the heater.

17. The invention of claims 15 or 16 and wherein said deflector extending from side to side of the ductwork in which the burner assembly locates.

18. The invention of claim 1 and wherein said opposed side walls having flared extensions formed thereon, said extensions flaring outwardly and increasing heightwise in their extension from their proximity with the gas manifold.

19. The invention of claim 1 and including a shroud arranged intermediate the burner assembly and the ductwork, said shroud useful for diverting a quantity of the blower induced air around the burner assembly and above and below the upper and lower tiered baffles, said shroud having an intake arranged behind the gas manifold for intaking of a capacity of the blower induced air for passage through the tiered baffles and their connected air balancing baffles and into the combustion chamber during heater operation.

20. In a burner assembly for location within an air supply housing and ductwork for a heater and disposed for inducing the movement of air by way of a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises, said gas manifold having a series of gas discharge ports provided along its length, said upper and lower tiered baffles each formed having a series of adjacently arranged tiers with each incorporating a series of openings therein for introduction of air into the combustion chamber during burner operation, and air balancing baffles connected upon each of the upper and lower tiered baffles, said air balancing baffles having a series of openings therein for introduction of air for passage through the tiered baffles and into the combustion chamber, the upper and lower tiered baffles and their connected air balancing baffles arranged next adjacent to the gas manifold incorporating a series of smaller openings directing a lesser quantity of air towards the combusting gas within the combustion chamber during heater functioning.

21. The invention of claim 20 and wherein said openings provided through the upper and lower tiered baffles and their connected air balancing baffles comprising slots.

22. The invention of claim 21 and wherein said slots provided through the air balancing baffles connected to the upper and lower tiered baffles arranged adjacent the gas manifold comprising approximately half slots.

23. The invention of claim 22 and wherein the slots arranged through the air balancing baffles connected to the upper and lower tiered baffles most remote from the gas manifold being greater in width than those slots provided through the air balancing baffles arranged most adjacent to said gas manifold.

24. The invention of claim 6 and wherein the series of slots provided through select tiers of the baffles being greater in number than the slots provided through the adjacent baffle tiers.

25. In a burner assembly for locating within an air supply housing and duct work for a heater and disposed for inducing the movement of air through a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises said gas manifold having a series of gas discharge ports provided along its length, and said upper and lower tiered baffles forming said combustion chamber, and said tiered baffles having air balancing baffles connected thereon, both of said tiered and air balancing baffles having arranged openings therethrough to regulate the flow of air through the baffles and thereby control the degree of burning within the formed combustion chamber, and a deflector connecting with each of the proximate upper front and lower front of the burner assembly and extending from approximately the forward end of the upper and lower tiered baffles, respectively, and provided for delaying and controlling the discharge of the flowing air passing through the assembly and above and below the burner and to the front of the burner assembly during functioning of the heater.

26. In a burner assembly for location within an air supply housing and duct work for a heater and disposed for inducing the movement of air through a blower and into and around a burner assembly during heater operation to create a supply of heated air for a space to be warmed, said burner assembly being of the type having opposite side walls and upper and lower tier baffles forming a combustion chamber for reception and combustion of gas delivered from a gas manifold arranged approximately at the intake end of the burner assembly, the improvement which comprises said gas manifold having a series of gas discharge ports provided along its length, and said upper and lower tiered baffles forming said combustion chamber, and said tiered baffles having air balancing baffles connected thereon, and both said tiered and air balancing baffles having arranged openings therethrough to regulate the flow of air through the baffles and thereby control the degree of burning within the formed combustion chamber, said tiered baffles and air balancing baffles having select openings therethrough to provide for a greater capacity of the flowing air to pass through the said baffles at a position forwardmost of said burner assembly than the capacity of air entering into the combustion chamber proximate the gas manifold.

27. The invention of claim 26 and including diverter means operatively associated with the gas manifold and provided for the urging of a greater capacity of the flowing air to pass towards to the forwardmost ends of the tiered and air balancing baffles than into the vicinity of said tiered and air balancing baffles more proximate to the gas manifold.

28. In a burner assembly for location within an air supply housing and duct work for a heater and disposed for inducing the movement of air through a blower and into and around a burner assembly during heater operation to create a supply of heated air for a space to be warmed, said burner assembly being of the type having opposite side walls and upper and lower tiered baffles forming a combustion chamber for reception and combustion of gas delivered from a gas manifold arranged approximately at the intake end of the burner assembly, the improvement which comprises said gas manifold having a series of gas discharge ports provided along its length, and said upper and lower tiered baffles forming said combustion chamber, and said tiered baffles having air balancing baffles connected thereon, and both said tiered and air balancing baffles having arranged openings therethrough to regulate the flow of air through the baffles and thereby control the degree of burning within the formed combustion chamber, the tiered baffles arranged most proximate to the gas manifold being connected therewith, said gas manifold having a frontal surface, and said tiered baffles being connected with said frontal surface at particular locations so as to provide for a controlled spacing between the upper and lower tiered baffles connected therewith for regulating the capacity of air entering into proximity with the frontal of the gas manifold during functioning of the burner assembly and the generation of flame within the combustion chamber.

29. The invention of claim 23 and wherein the slots arranged through the air balancing baffles being of varying widths for those air balancing baffles arranged intermediate the upper and lower tiered baffles most remote and most adjacent with respect to the gas manifold.

30. The invention of claim 27 and including flange means provided on the diverter means to provide for the directing of greater capacity of flowing air more remote from the gas manifold.

* * * * *